United States Patent
Druker et al.

(10) Patent No.: US 9,507,245 B1
(45) Date of Patent: Nov. 29, 2016

(54) DETACHABLE CAMERA MOUNT

(71) Applicant: GoPro, Inc., San Mateo, CA (US)

(72) Inventors: Joshua Todd Druker, Redwood City, CA (US); Christopher Aaron Clearman, Half Moon Bay, CA (US); Eric McCallister Bennett, Foster City, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/164,870

(22) Filed: May 26, 2016

Related U.S. Application Data

(63) Continuation-in-part of application No. 14/854,040, filed on Sep. 15, 2015, now Pat. No. 9,377,672.

(51) Int. Cl.
- *G03B 17/56* (2006.01)
- *F16M 13/02* (2006.01)
- *A42B 3/04* (2006.01)
- *G03B 17/08* (2006.01)

(52) U.S. Cl.
CPC ............. *G03B 17/561* (2013.01); *A42B 3/042* (2013.01); *F16M 13/02* (2013.01); *G03B 17/08* (2013.01)

(58) Field of Classification Search
None
See application file for complete search history.

(56) References Cited

U.S. PATENT DOCUMENTS

| | | | | |
|---|---|---|---|---|
| 5,938,492 | A * | 8/1999 | Carlini | B63B 35/7933 441/75 |
| 7,011,460 | B1 * | 3/2006 | Todd | G03B 17/561 396/427 |
| 8,870,475 | B1 | 10/2014 | Bennett et al. | |
| 9,268,201 | B1 * | 2/2016 | Montgomery | G03B 17/561 |
| 9,377,672 | B1 * | 6/2016 | Clearman | G03B 17/561 |
| 2010/0299814 | A1 * | 12/2010 | Celona | G02B 23/125 2/422 |
| 2012/0099849 | A1 * | 4/2012 | Onishi | B60R 11/04 396/419 |
| 2012/0315813 | A1 * | 12/2012 | Rossini | B63B 22/00 441/1 |
| 2013/0184033 | A1 | 7/2013 | Willenborg | |
| 2014/0105589 | A1 | 4/2014 | Samuels | |
| 2014/0321843 | A1 | 10/2014 | Hulse | |
| 2015/0177597 | A1 | 6/2015 | Harrison et al. | |
| 2015/0286117 | A1 | 10/2015 | Sung et al. | |
| 2016/0131964 | A1 * | 5/2016 | Basulto | G03B 17/563 396/420 |
| 2016/0209733 | A1 * | 7/2016 | Akai | G03B 17/561 |

OTHER PUBLICATIONS

United States Office Action, U.S. Appl. No. 14/854,040, Feb. 4, 2016, 7 pages.

\* cited by examiner

*Primary Examiner* — W B Perkey
(74) *Attorney, Agent, or Firm* — Fenwick & West LLP

(57) ABSTRACT

Various camera mounts used to attach a camera to a helmet, vehicle, user, or other object are described. In one embodiment, a flexible camera mount deforms under impact, allowing an attached camera to detach without fracturing the mount. In a second embodiment, a non-flexible camera mount fractures under impact, allowing an attached camera to detach. In a third embodiment, a camera mount comprising a ring base and a floating base separates under impact, allowing a camera attached to the floating base to detach. In a fourth embodiment, a non-flexible camera mount including two rigid sections joined in a "V" shape fractures under impact, allowing the camera to detach. In a fifth embodiment, a flexible camera mount comprising two sections connected in a "V" shape separate under impact, allowing the camera to detach.

26 Claims, 15 Drawing Sheets

DETACHABLE CAMERA MOUNT

CROSS REFERENCE TO RELATED APPLICATIONS

This application is a continuation-in-part of U.S. application Ser. No. 14/854,040, filed Sep. 15, 2015, now U.S. Pat. No. 9,377,672, which is incorporated by reference in its entirety.

BACKGROUND

Technical Field

This disclosure relates camera mounts, and more specifically, to camera mounts configured to detach in response to force.

Description of the Related Art

Digital cameras are increasingly used in outdoors and sports environments. Cameras can be secured to sports equipment, vehicles, a user, and other objects using various camera mounts. When the object to which the camera is secured is in motion, it is beneficial for the camera to detach from the object in the event of a force being exerted on the camera. Such detachment can beneficially protect the camera, the mount, and/or the object to which the camera is secured from potential damaged caused by the exerted force.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. (or "FIG.") 1a illustrates a perspective view of a camera system, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Various camera mount embodiments for securing a camera to a mounting surface, such as a helmet or vehicle exterior, are described. The mounts are designed to allow the camera to detach from its mounting surface upon impact with an object. Some embodiments are reusable and allow for the mount to be re-assembled and reused. Other embodiments detach permanently in order to release a camera from its mounting surface, and as such are not reusable. All embodiments described are designed to accommodate a base mount component which is connectively coupled to a camera housing containing a camera.

Embodiments designed for re-use are typically made out of a flexible material such as polycarbonate. These embodiments temporarily deform under impact, allowing the mounted camera assembly to detach. Some reusable embodiments feature two pieces that separate on impact but can be reassembled for repeated use. Embodiments designed for one-time use are made out of a brittle material such as acrylic. These embodiments fracture under impact, allowing the mounted camera assembly to detach.

Example Camera System Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 1A:
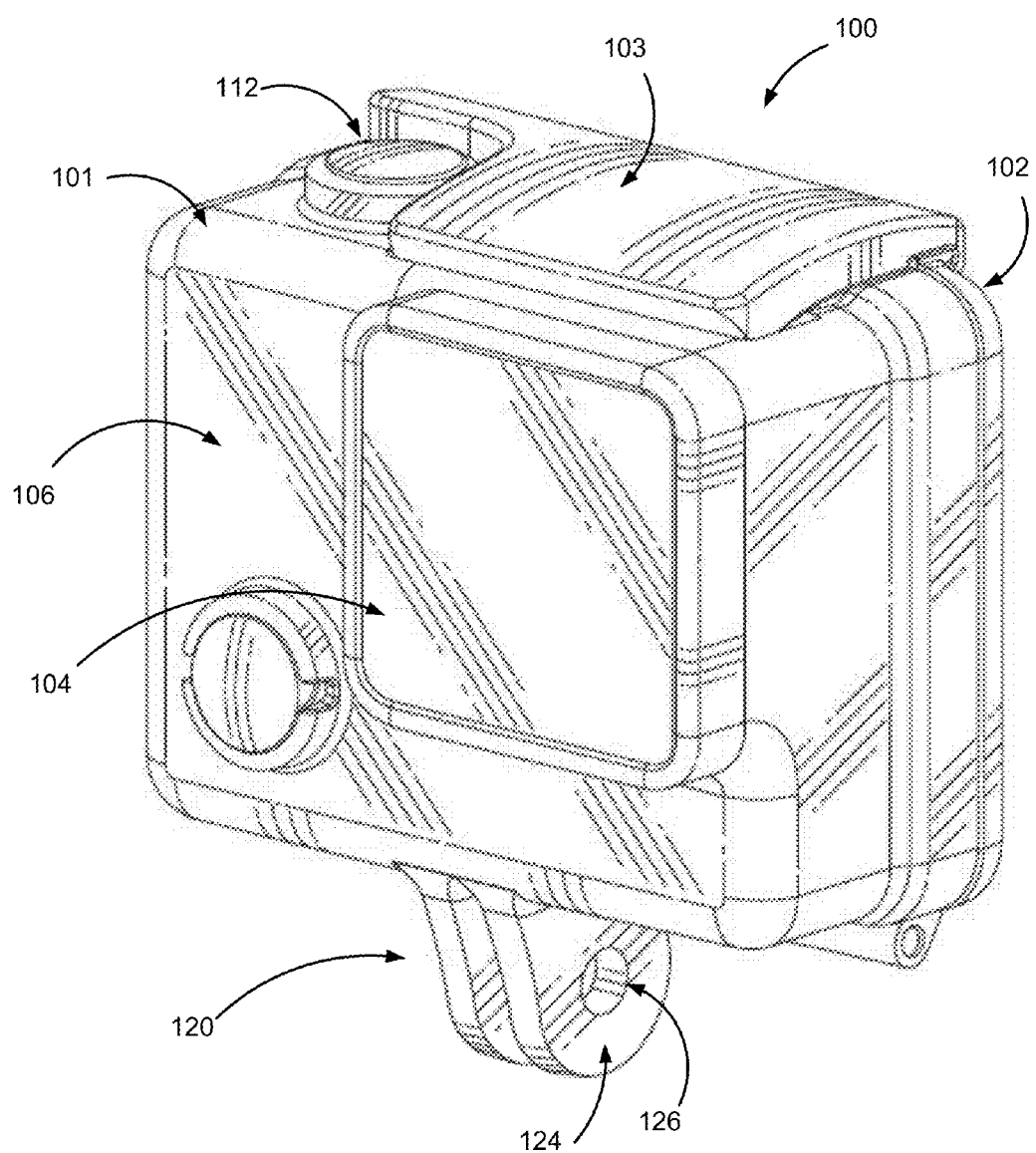
FIG. 1b illustrates a perspective view of a rear of the camera system, according to one embodiment.
FIG. 1c illustrates a lower mount component uncoupled to a base mount component, according to one embodiment.
FIG. 1d illustrates a lower mount component coupled to a base mount component, according to one embodiment.

FIG. 1a illustrates a perspective view of a camera system, according to one embodiment. The camera system includes, among other components, a camera housing 100. In one embodiment, a first housing portion 101 includes a front face with four sides (i.e., a top side, bottom side, left side, and right side) structured to form a cavity that receives a camera (e.g. a still camera or video camera) and to couple to a second housing portion 102 via a coupling mechanism 103. In other embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button 112 of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes one or more securing structures 120 for securing the camera housing 100 to one of a variety of mounting devices. For example, FIG. 1a illustrates the camera housing with a first plurality of protrusions 124 configured to interlock with a second plurality of protrusions of a lower mount component (as described in conjunction with FIG. 1c) such that the first and second pluralities of protrusions can interlock in such a way that the protrusion holes substantially align. Continuing with this example, a turnable handscrew can be inserted through the aligned holes, coupling the camera housing 100 to the lower mount component such that the camera housing can pivotally rotate relative to the lower mount component when the turnable handscrew is in a first unlocked position, and such that the camera housing is fixed in position relative to the lower mount component when the turnable handscrew is in a second locked position. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

Figure 1B:
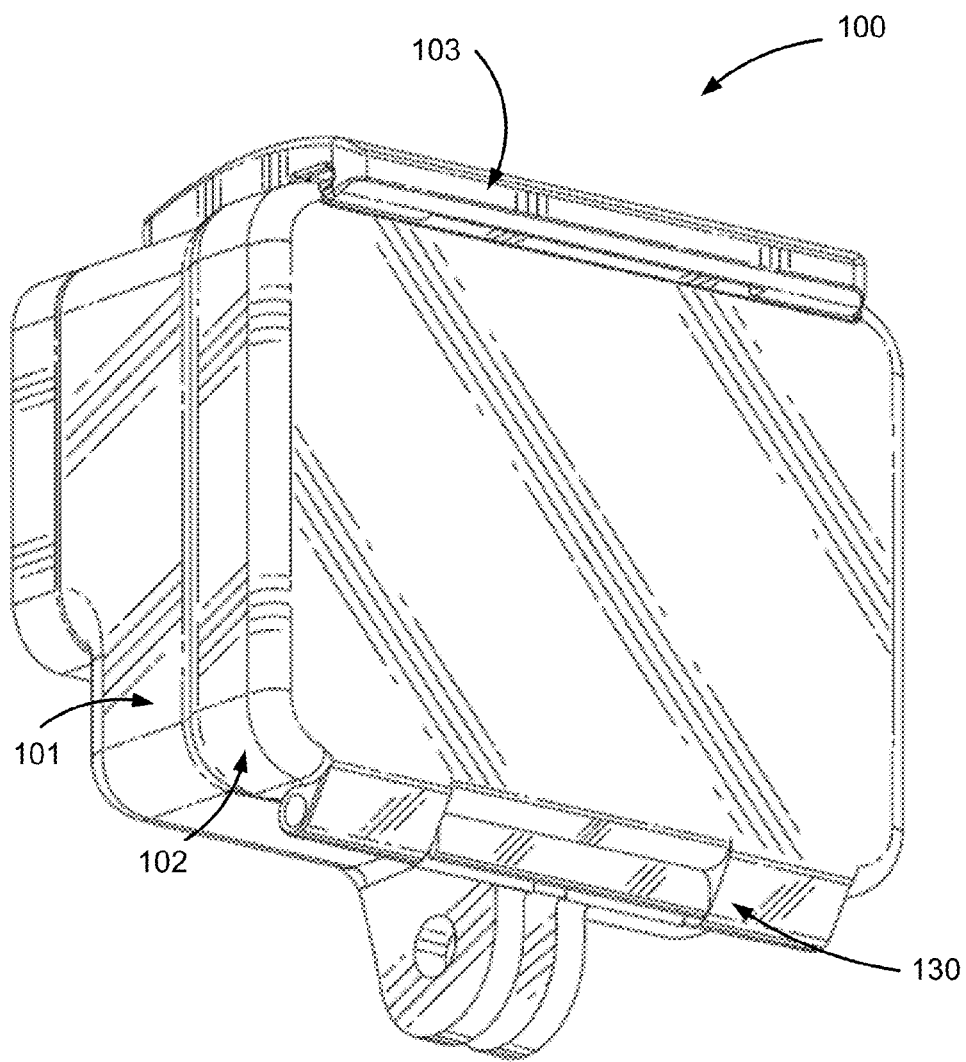

FIG. 1b illustrates a perspective view of a rear of the camera system, according to one embodiment. The second housing portion 102 detachably couples with the first housing portion 101 opposite the front face of the first housing portion. The first housing portion 101 and second housing portion 102 are collectively structured to enclose a camera within the cavity when the second housing portion 102 is secured to the first housing portion 101 in a closed position.

In one embodiment, the second housing portion 102 comprises a door that allows the camera to be removed from the housing 100. The door pivots around a hinge 130 that allows the door 130 to be opened or shut. In one embodiment, a coupling mechanism 103 located on the top face of the camera housing 100 detachably couples to a ridge on the second housing portion 102. The coupling mechanism 103 can be pressed downwards to secure the coupling mechanism 103 into place, thereby securing the second housing portion 102 against the first housing portion 101. Likewise, the coupling mechanism 103 can be lifted upwards to release the second housing portion 102 from the first housing portion 101, thereby allowing for the removal of a camera from the camera housing 100 or the insertion of a camera into the camera housing. In different embodiments, the coupling mechanism 103 can include, for example, a button assembly, a buckle assembly, a clip assembly, a hook and loop assembly, a magnet assembly, a ball and catch assembly, a latch assembly, and an adhesive assembly, or any other type of securing mechanism. In one embodiment, the housing 100 includes a watertight seal so that the housing 100 is waterproof when the second housing portion 102 is securely compressed against the first housing portion 101.

Figure 1C:
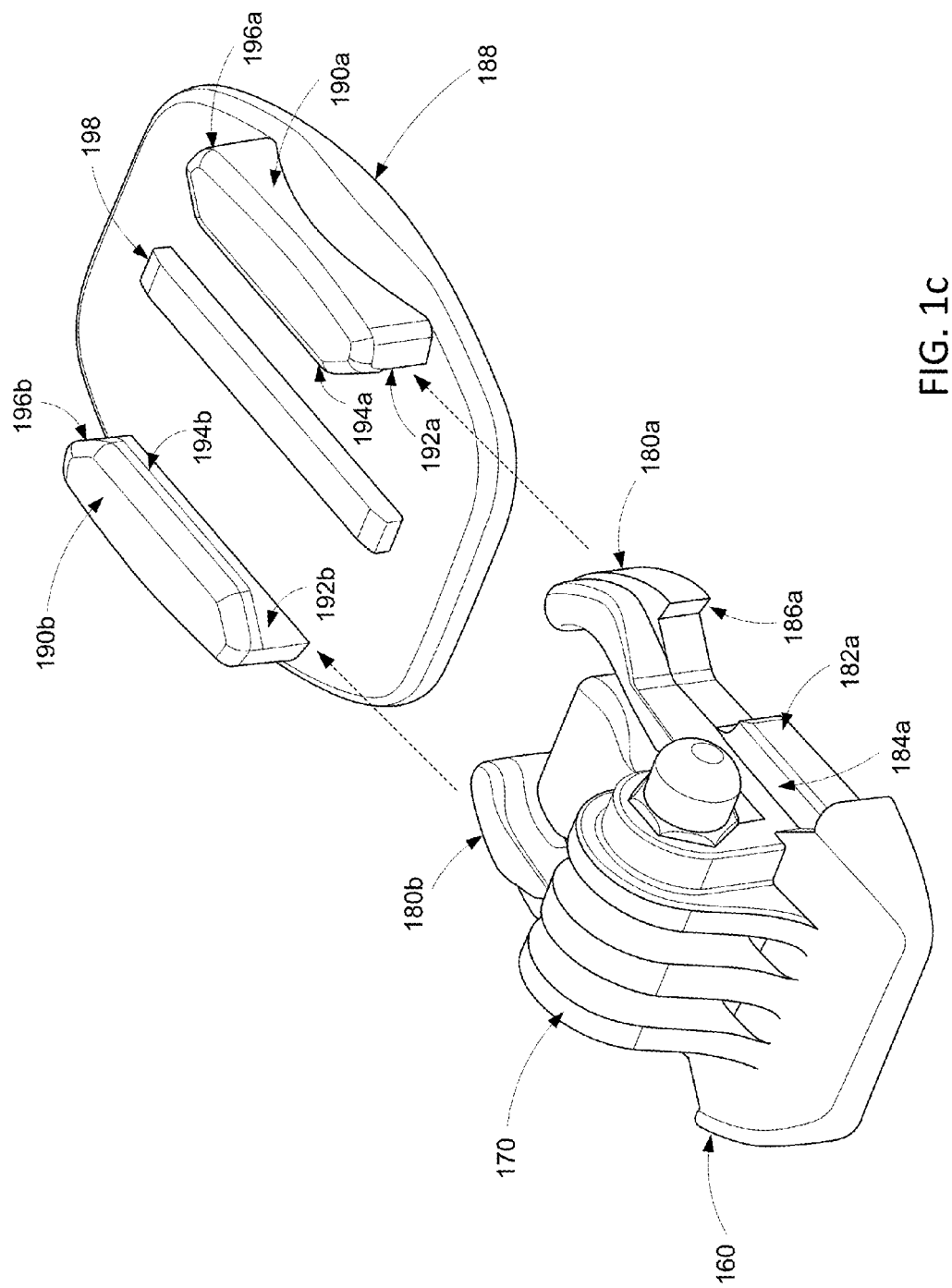

FIG. 1c illustrates a lower mount component uncoupled from a base mount component, according to one embodiment. The lower mount component 160 includes a plurality of protrusions 170. In some embodiments, the plurality of protrusions 170 are configured to interlock with the plurality of protrusions 124 of the camera housing 100 of FIG. 1a such that the holes in each protrusion in the sets of protrusions align. When a screw or pin is inserted into the aligned holes, the camera housing 100 can be rotatably secured to the lower mount component 160.

The lower mount component 160 also includes two prongs 180a and 180b that can be flexibly compressed inward when squeezed. The prongs 180a and 180b include side securing surfaces 182a and 182b (not shown), top securing surfaces 184a and 184b, and securing lips 186a and 186b (not shown), respectively. The base mount component 188 includes securing arms 190a and 190b, each with side securing surfaces 192a and 192b, top securing surfaces 194a and 194b, and back securing surfaces 196a and 196b, respectively. The base mount component additionally includes spine 198.

Figure 1D:
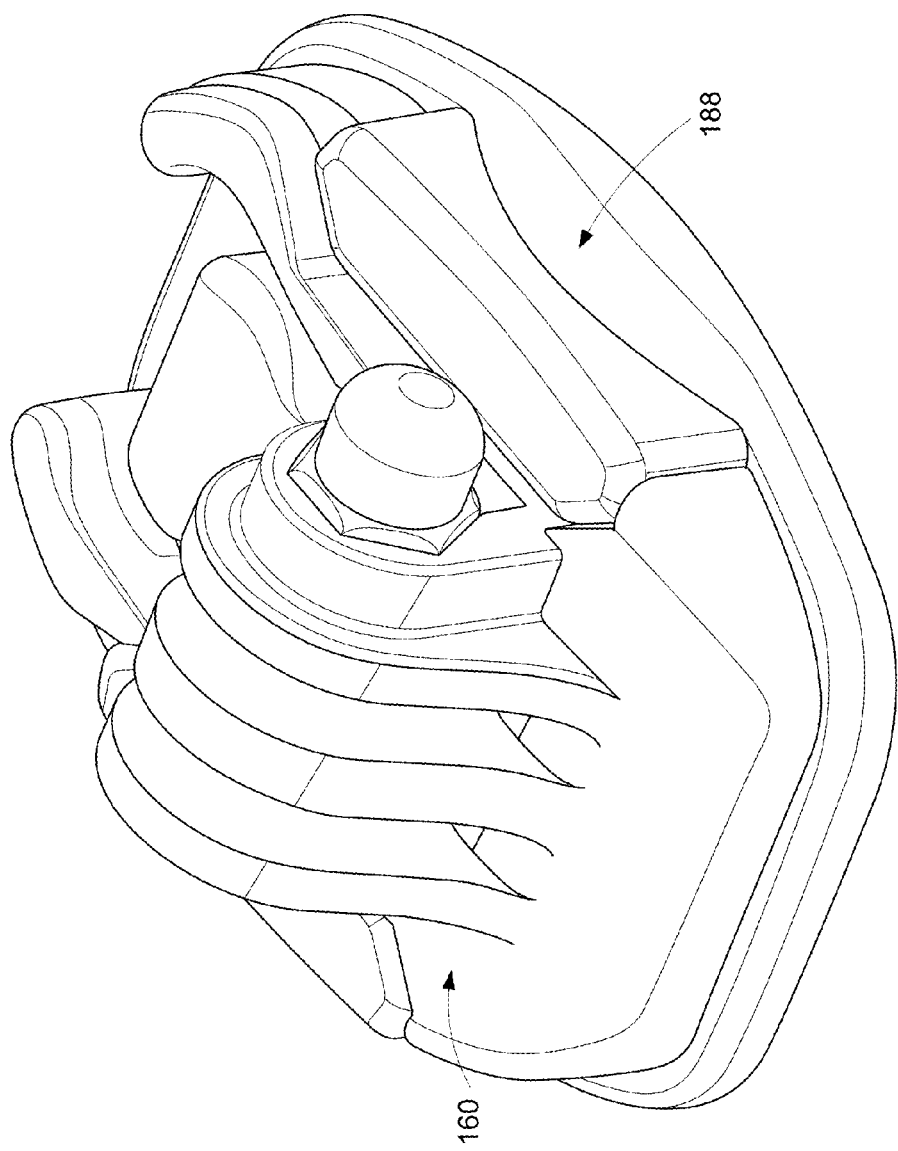

When the prongs 180a and 180b of the lower mount component 160 are squeezed together, the width of the prong-side of the lower mount component is reduced to less than the width between the securing arms 190a and 190b, such that the lower mount component can be slid onto the base mount component 188. When the lower mount component is slid onto the base mount component 188, the side securing surfaces 182a and 182b make contact with and slide along the side securing surfaces 192a and 192b, respectively. Similarly, the top securing surfaces 184a and 184b make contact with and slide along the top securing surfaces 194a and 194b, respectively. When the lower mount component is completely slid into the base mount component 188, the securing arms decompress outward when the securing lips 186a and 186b are slid past the back securing surfaces 196a and 196b. The securing arms flexibly exert force outward such that the securing lips extend outwards and make contact with the back securing surfaces or overlap at least partially with the back securing surfaces, preventing the lower mount component from sliding backwards and securely coupling the lower mount component to the base mount component as illustrated in FIG. 1d. The lower mount component can be uncoupled from the base mount component by compressing the securing arms of the lower mount component such that the width of the prong-side of the lower mount component is again reduced to less than the width between the securing arms of the base mount component, and sliding the lower mount component backwards past the base mount component.

The lower mount component 160 can include a spine groove on the bottom side of the lower mount component to allow for the reciprocal sliding and insertion of the spine 198 of the base mount component 188 into the spine groove when the lower mount component is slid onto and secured to the base mount component. The spine of the base mount component exerts a force upwards on the lower mount component, forcing the lower mount component upward such that the top securing surfaces 184a and 184b are forced upward into the top securing surfaces 194a and 194b.

The upward force of the lower mount component 160 into the top securing surfaces 194a and 194b of the securing arms 190a and 190b result in the vertical securement of the lower mount component onto the base mount component. In other words, by forcing the lower mount component upwards, the spine 198 prevents any up or down motion by the lower mount component relative to the base mount component. In addition, the upwards force exerted by the spine 198 into the lower mount component (the force exerted by the top securing surfaces 182a and 182b into the top securing surfaces 192a and 192b, respectively), in combination with the coefficient of friction between both the top securing surfaces 182a and 192a and the top securing surfaces 182b and 192b, results in a friction force between the lower mount component and the base mount component. The friction force prevents any horizontal movement of the lower mount component relative to the base mount component resulting from horizontal forces on the lower mount component less than the friction force. Thus, the spine 198 secures the lower mount component onto the base mount component by preventing both the vertical and the horizontal movement of the lower mount component relative to the base mount component.

It should be noted in alternative embodiments, the lower mount component 160 is configured to securely couple to the base mount component 188 using other means than those described with regards to FIGS. 1c and 1d. For example, the lower mount component can include a securing protrusion on the bottom side of the lower mount component configured for insertion into a reciprocal opening within the base mount component, and secured using, for example, a securing pin or other locking mechanism. Similarly, the securing arms 190a and 190b of the base mount component can be compressible or flexible such that the arms can be squeezed apart, the lower mount component can be slid onto the base mount component, and the arms can be released, securely coupling the lower mount component to the base mount component. The lower mount component can be securely coupled to the base mount component using adhesives, buttons, ties, latches, springs, or any combination of the mechanisms described herein. Any other suitable securing mechanism can be used to secure the lower mount component to the base mount component. In addition, as will be described below in greater detail, the lower mount component, the base mount component, or both can be configured to detach such that a camera housing can decouple to the lower mount component or such that the lower mount component can decouple from a base mount component in response to a force exerted on the camera housing, the lower mount component, the base mount component, or any combination thereof.

Figure 2A:
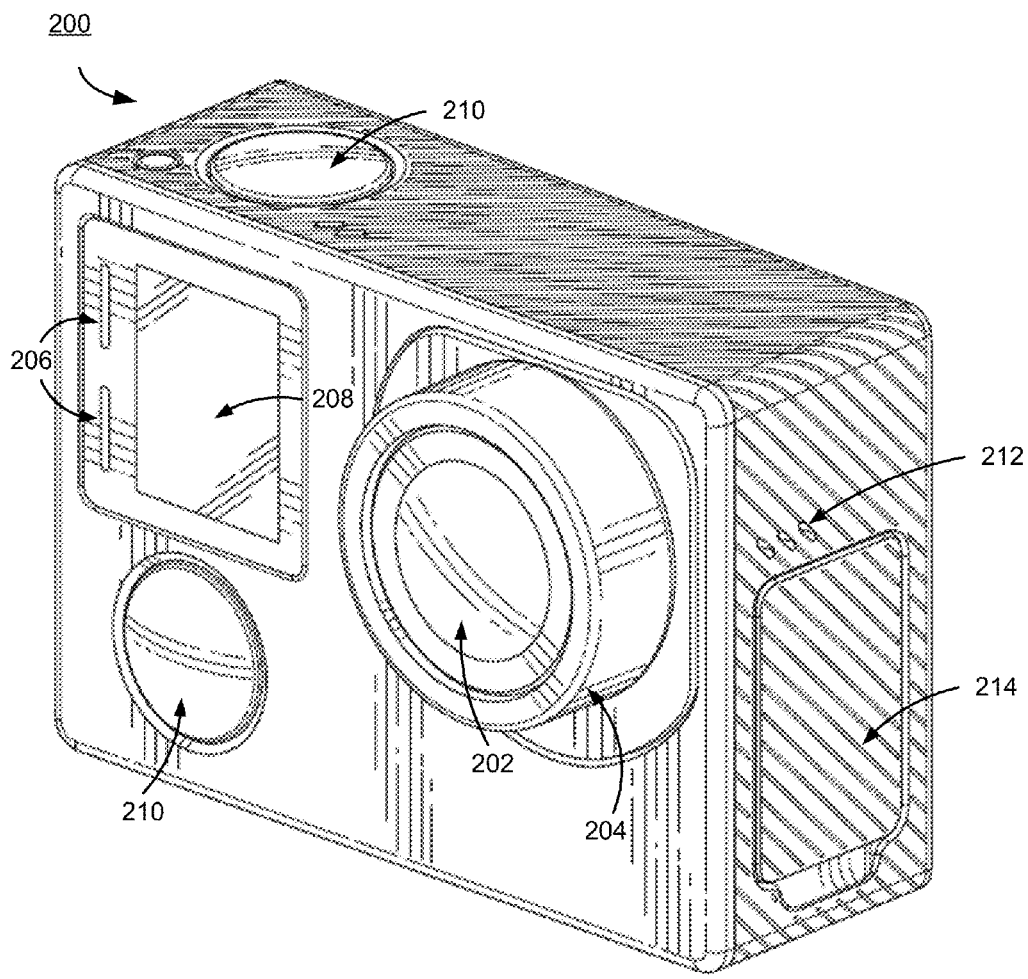
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens. The lens 202 is enclosed by a lens ring 204.

The camera 200 can include various indicators, including the LED lights 206 and the LED display 208 shown in FIG. 2a. When the camera 200 is enclosed within the housing 100, the LED display 208 is configured to substantially align with the indicator window 106, and the LED lights 206 are configured to be visible through the housing 100. The camera 200 can also include buttons 210 configured to allow a user of the camera to interact with the camera, to turn the camera on, and to otherwise configure the operating mode of the camera. The camera 200 can also include one or more microphones 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
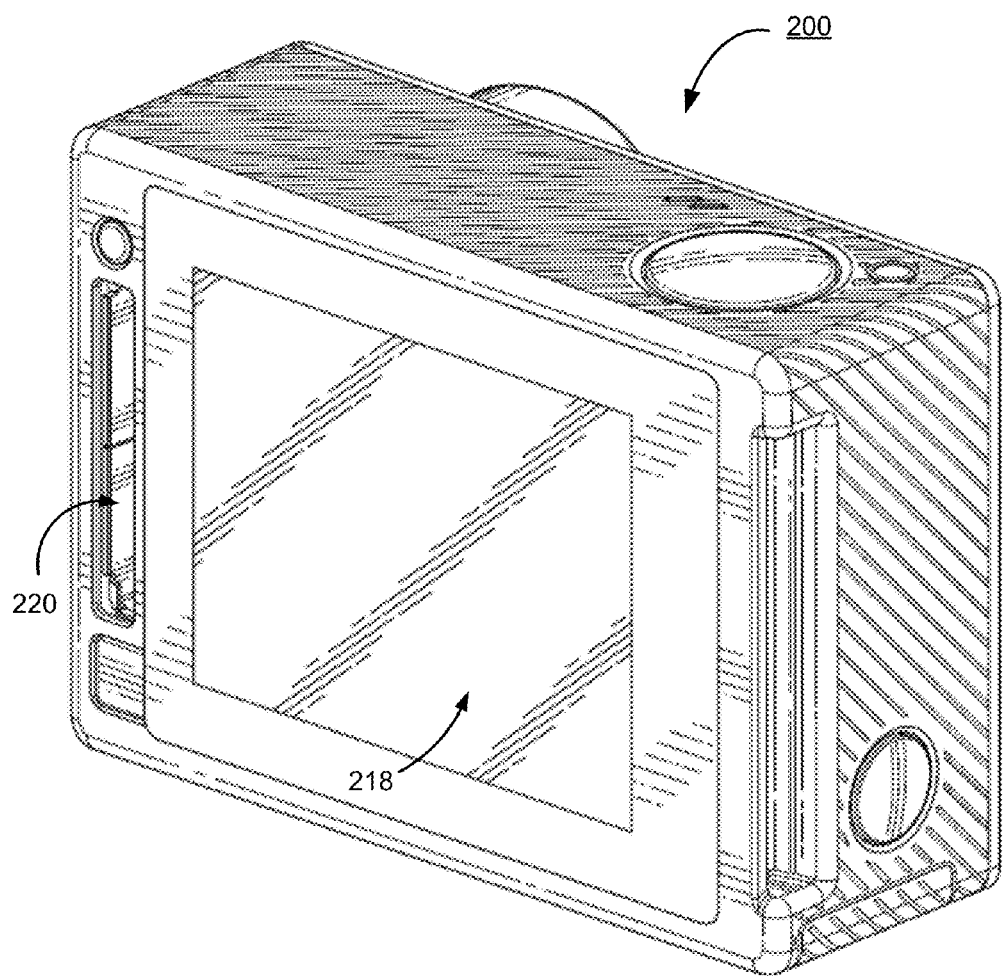
FIG. 2b illustrates a perspective view of a rear of a camera for use with the camera system, according to one embodiment.

FIG. 2b illustrates a perspective view of a rear of a camera 200 for use with the camera system, according to one embodiment. The camera 200 includes a display 218 configured to display camera information or image information (such as captured images or viewfinder images). The camera also includes an expansion pack interface 220 configured to receive a removable expansion pack, such as a display module, an extra battery module, a wireless module, and the like. Removable expansion packs, when coupled to the camera 200, provide additional functionality to the camera via the expansion pack interface 220.

Detachable Camera Mount Embodiments

In a first embodiment, a camera mount allows for a camera assembly to detach from the camera mount upon impact, while the mount remains attached to a mounting surface, allowing the camera assembly to be re-attached to the camera mount for subsequent use. The camera assembly can include one or more of a camera housing, a camera, and a lower mount component coupled to a base mount component. The base mount component fits into and is secured by the camera mount, which is in turn attached to a mounting surface.

Figure 3:
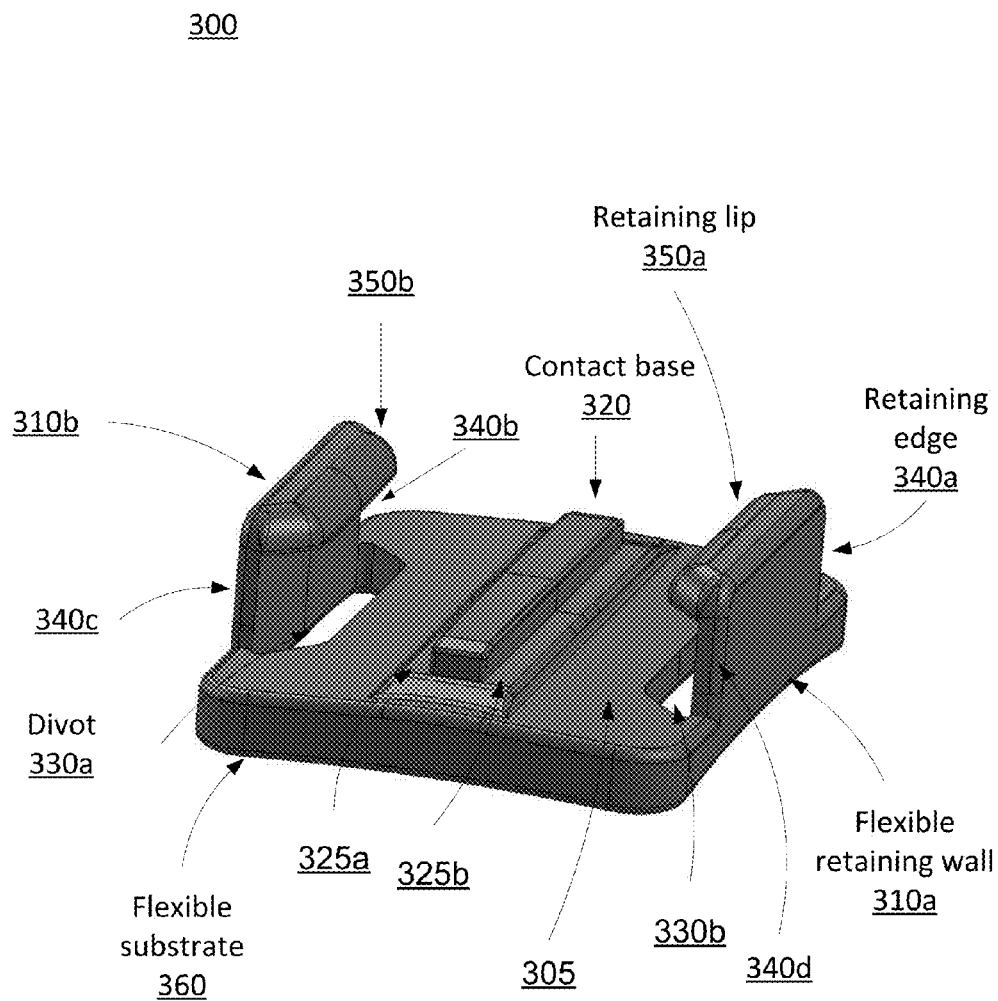
FIG. 3 illustrates a flexible camera mount, according to one embodiment.

FIG. 3 illustrates a camera mount, according to one embodiment. The camera mount 300 includes flexible retaining walls 310a and 310b at opposite ends of a flexible substrate 360. The camera mount 300 features four retaining edges, 340a, 340b, 340c, and 340d, two on each retaining wall. At the bottom of the retaining walls are divots 330a and 330b that allow for increased flexibility. The mount 300 also features two retaining lips 350a and 350b, one at the top of each retaining wall. Along the centerline of the substrate 360, the camera mount 300 also includes a contact base 320.

Referring back to FIG. 1c, when the prongs 180a and 180b of the lower mount component 160 are squeezed together, the width of the prong-side of the lower mount component is reduced to less than the width between the retaining walls 310a and 310b, such that the lower mount component can be slid onto the flexible mount 300. When the lower mount component is slid onto the camera mount 300, the side securing surfaces 182a and 182b make contact with and slide along the retaining walls 310a and 310b, respectively. Similarly, the top securing surfaces 184a and 184b make contact with and slide along the underside of the retaining lips 350a and 350b, respectively. When the lower mount component is completely slid into the camera mount 300, the securing arms decompress outward when the securing lips 186a and 186b are slid past the retaining edges 340a and 340b respectively. The securing arms flexibly exert force outward such that the securing lips extend outwards and make contact with retaining edges or overlap at least partially with the retaining edges, preventing the lower mount component 160 from sliding backwards and securely coupling the lower mount component to the camera mount. The lower mount component 160 can be uncoupled from flexible mount 300 by compressing the securing arms of the lower mount component such that the width of the prong-side of the lower mount component is again reduced to less than the width between the retaining walls 310a and 310b of the flexible mount 300, and sliding the lower mount component 160 backwards out between the retaining walls 310a and 310b.

As described in previous embodiments, the lower mount component 160 can include a spine groove on the bottom side of the lower mount component to allow for the reciprocal sliding and insertion of the contact base 320 of flexible mount 300 into the spine groove when the lower mount component is slid onto and secured to the camera mount 300. The contact base 320 of the mount 300 exerts a force upwards on the lower mount component 160, forcing the lower mount component upward such that the top securing surfaces 184a and 184b are forced upward into the underside of the retaining lips 350a and 350b on the flexible retaining walls 310a and 310b respectively.

In a typical embodiment, the camera housing 100 of FIG. 1a is coupled to the lower mount component 160, which is then fitted into the flexible camera mount 300 as described previously. The entire assembly may be attached by an adhesive to a mounting surface, such as the outer surface of a helmet. In the course of normal sports or recreation activity, an impact may occur between the helmet and another object such that a normal force is exerted onto the camera housing 100. This normal force will act on the assembly, resulting in a normal force exerted on the camera mount 300 by the lower mount component 160. In this situation, the normal force exerted on the mount 300 will act on one of the flexible retaining walls 310a and 310b, causing one or both of the retaining walls 310a and 310b to flex outward and away from the center of the mount 300. In response, a corresponding retaining lip 350 will no longer abut a corresponding top securing surface 184, causing the lower mount component 160 to become uncoupled from the reusable camera mount 300. The flexible retaining wall will return to its original position and the reusable camera mount 300, now empty, will remain intact and attached to its mounting surface.

In some embodiments, on either side of the contact base 320, elevated surfaces 325a, 325b protrude upward from a top surface 305 of the mount 300. In such embodiments, a bottom surface of the lower mount component 160, when the lower mount component 160 is coupled to the mount 300, abuts the elevated surfaces 325a, 325b such that gaps are formed between portions of the bottom surface of the lower mount component 160 and the top surface 305. Such gaps beneficially allow the lower mount component 160 to tilt, in response to a force exerted upon the lower mount component, into the gaps relative to the mount 300, causing one or more of the walls 310a, 310b to flex away from the center of the mount 300, in turn causing the lower mount component 160 to become uncoupled from the mount 300.

In another embodiment, a non-flexible mount made out of a brittle material, such as acrylic, allows for the camera assembly described in previous embodiments to detach upon impact. When subjected to a force of sufficient magnitude, the mount can fracture, and beneficially causing a coupled camera to become uncoupled from the mount.

Figure 4A:
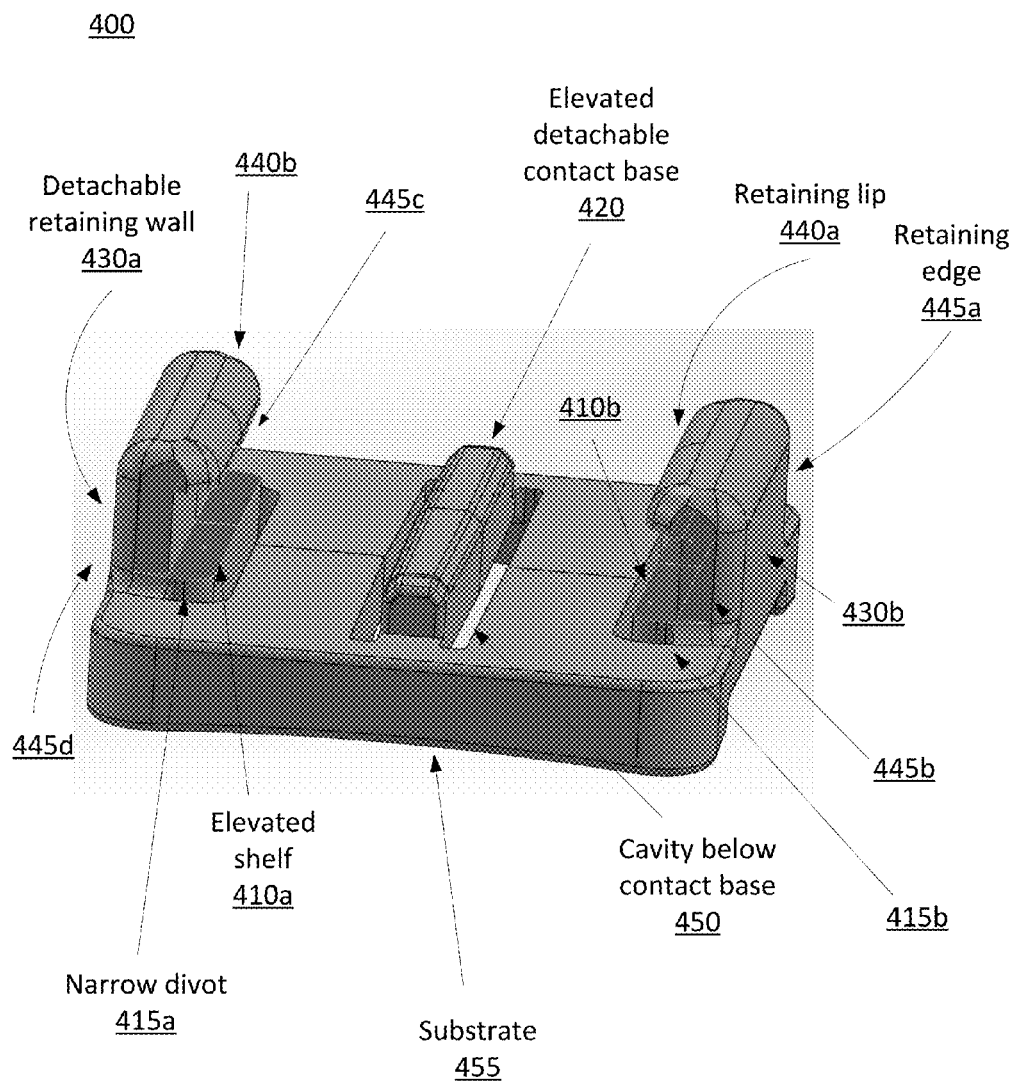
FIG. 4a illustrates a top view of a non-flexible camera mount, according to one embodiment.

FIG. 4a illustrates a top view of a non-flexible camera mount, according to one embodiment. The camera mount 400 is composed of a brittle, non-flexible material (such as an acrylic or plastic material). The mount 400 includes a substrate 455. The lower surface of the substrate may be attached to a surface. Two detachable retaining walls 430a and 430b protrude from the upper surface of the substrate 455. The mount 400 includes the four retaining edges 445a, 445b, 445c, and 445d, as in the embodiment of FIG. 3. Additionally, two retaining lips 440a and 440b protrude from the top of the detachable retaining walls 430a and 430b. Two elevated shelves 410a and 410b protrude from the bases of the retaining walls 430a and 430b at a higher elevation from the top surface of the substrate 455. Two divots 415a and 415b surround the shelves 410a and 410b. An elevated detachable contact base 420 runs down the middle of the substrate. A cavity 450 is located along both sides and below the contact base 420.

Figure 4B:
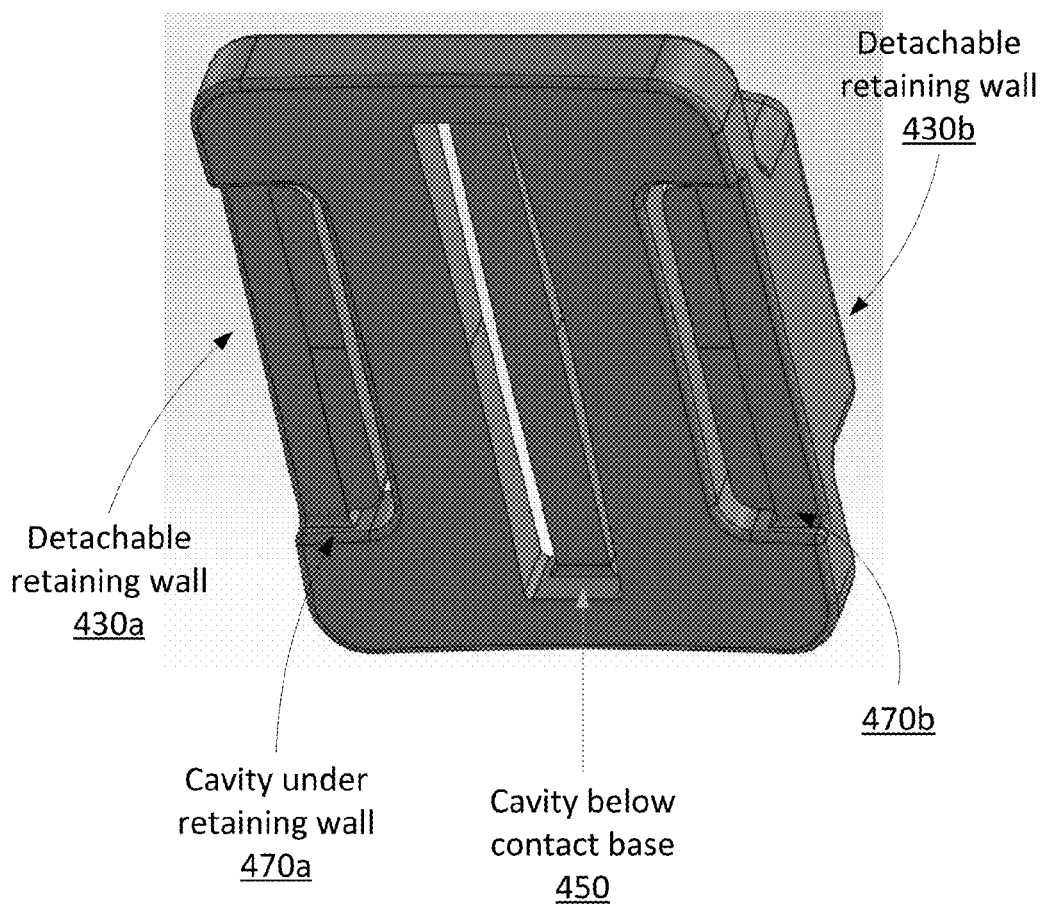
FIG. 4b illustrates a bottom view of a non-flexible camera mount, according to one embodiment.

FIG. 4b illustrates a bottom view of the camera mount 400 of FIG. 4a. Below each detachable retaining walls 430a and 430b is a cavity 470a and 470b, respectively.

As described above, when the prongs 180a and 180b of the lower mount component 160 of FIG. 1c are squeezed together, the width of the prong-side of the lower mount component is reduced to less than the width between the detachable retaining walls 430a and 430b, such that the lower mount component can be slid onto the mount 400. When the lower mount component is slid onto the mount 400, the side securing surfaces 182a and 182b make contact with and slide along the detachable retaining walls 430a and 430b, respectively. Similarly, the top securing surfaces 184a and 184b make contact with and slide along the underside of the retaining lips 440a and 440b, respectively. When the lower mount component is completely slid into the camera mount 400, the securing arms decompress outward when the lips 186a and 186b are slid past the retaining edges 445a and 445b respectively. The securing arms flexibly exert force outward such that the securing lips extend outwards and make contact with retaining edges or overlap at least partially with the retaining edges, preventing the lower mount component 160 from sliding backwards and securely coupling the lower mount component to the camera mount. The lower mount component 160 can be uncoupled from the mount 400 by compressing the securing arms of the lower mount component such that the width of the prong-side of the lower mount component is again reduced to less than the width between the detachable retaining walls 430a and 430b of the mount 400, and sliding the lower mount component 160 backwards out between the retaining walls.

As described above, the lower mount component 160 of FIG. 1c can include a spine groove on the bottom side of the lower mount component to allow for the reciprocal sliding and insertion of the elevated detachable contact base 420 of the mount 400 into the spine groove when the lower mount component is slid onto and secured to the camera mount 400. The elevated detachable contact base 420 of the mount 400 exerts a force upwards on the lower mount component 160, forcing the lower mount component upward such that the top securing surfaces 184a and 184b are forced upward into the underside of the retaining lips 440a and 440b on the detachable retaining walls 430 and 430b respectively.

In a typical embodiment, the camera housing 100 of FIG. 1a is coupled to the lower mount component 160, which is then fitted into the camera mount 400 as described previously. The entire assembly may be attached by an adhesive to a mounting surface, such as the outer surface of a helmet. In the course of normal sports or recreation activity, an impact may occur between the helmet and another object such that a normal force is exerted onto the camera housing 100. This normal force will act on the assembly, resulting in a normal force exerted on the camera mount 400 by the lower mount component 160. If the exerted force is of sufficient magnitude, the detachable elevated contact base 420 may fracture and fall into the cavity 450, and one or both of the detachable retaining walls 430a and 430b will also fracture and move into the cavities 470a and 470b depicted in FIG. 4b. The detachment of each of these components will cause the lower mount component 160 to detach from the mount 400.

In the embodiment of FIGS. 4a and 4b, the detachable retaining walls 430a and 430b are coupled to the substrate 455 by two points of contact on either side of the base of the retaining walls. Similarly, the contact base 420 is coupled to the substrate 455 by two points of contact on either side of the base of the retaining walls. The divots 415a and 415b, and the cavity 450 surround portions of the base of the retaining walls 430a and 430b and the base 420, beneficially enabling the walls 430a and 430b and the base 420 to detach from the substrate 455 in response to a force exerted on the walls 430a and 430b and the base 420, as described above. In some embodiments, each point of contact associated with the retaining walls 430a and 430b and the base 420 have a smaller width or depth than the walls 430a and 430b and the base 420, respectively. In such embodiments, when a force is exerted on a wall 430a or 430b or the base 420, the wall 430a or 430b or the base 420 will detach from the substrate 455 at the point of contact.

In another embodiment, a mount consists of a rectangular ring base, attached to a mounting surface, and a floating base designed to couple to a camera assembly as described previously. The floating base is coupled to the ring base by a plurality of connecting tabs. In response to a force exerted on the camera assembly, one or more connecting tabs may fracture or detach from the ring base. In response, the floating base and the camera assembly detach from the ring base.

Figure 5A:
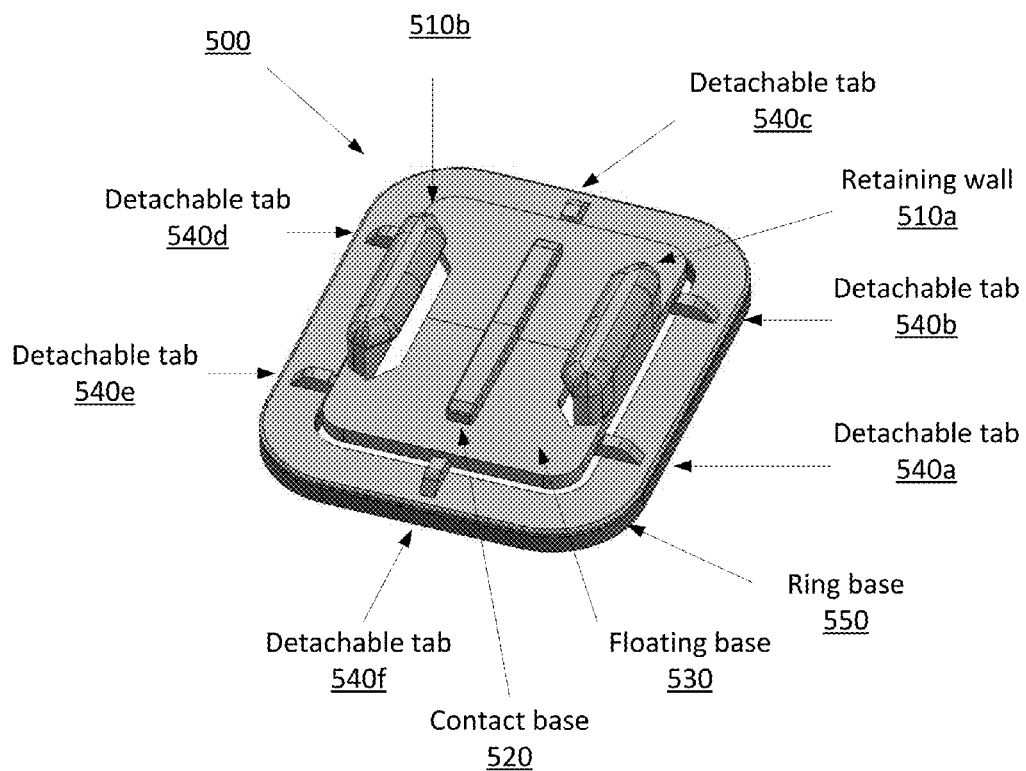
FIG. 5a illustrates a top view of a non-flexible camera mount, according to one embodiment.

FIG. 5a illustrates a top view of a non-flexible camera mount, according to another embodiment. The camera mount 500 includes a four-sided rectangular ring base 550, which may be coupled to a mounting surface, such as the outside of a helmet. Inside the ring base, the mount 500 includes a four-sided rectangular floating base 530. The floating base features a contact base 520 and retaining walls 510a and 510b as described above. The floating base 530 is coupled to the ring base 550 by six detachable tabs 540a, 540b, 540c, 540d, 540e, and 540f. Both the ring base 550 and floating base 530 are rectangular as previously described; therefore, the sides of the floating base 530 on which the retaining walls are attached each include two detachable tabs; the other two sides each include only one detachable tab. It should be noted that in some embodiments, other numbers and arrangements of detachable tabs couple the floating base 530 to the ring base 550, for example one detachable tab for each side of the floating base 530, two detachable tabs for each side of the floating base 530, and one or more detachable tabs on two sides of the floating base 530 with zero tabs on the remaining two sides.

Figure 5B:
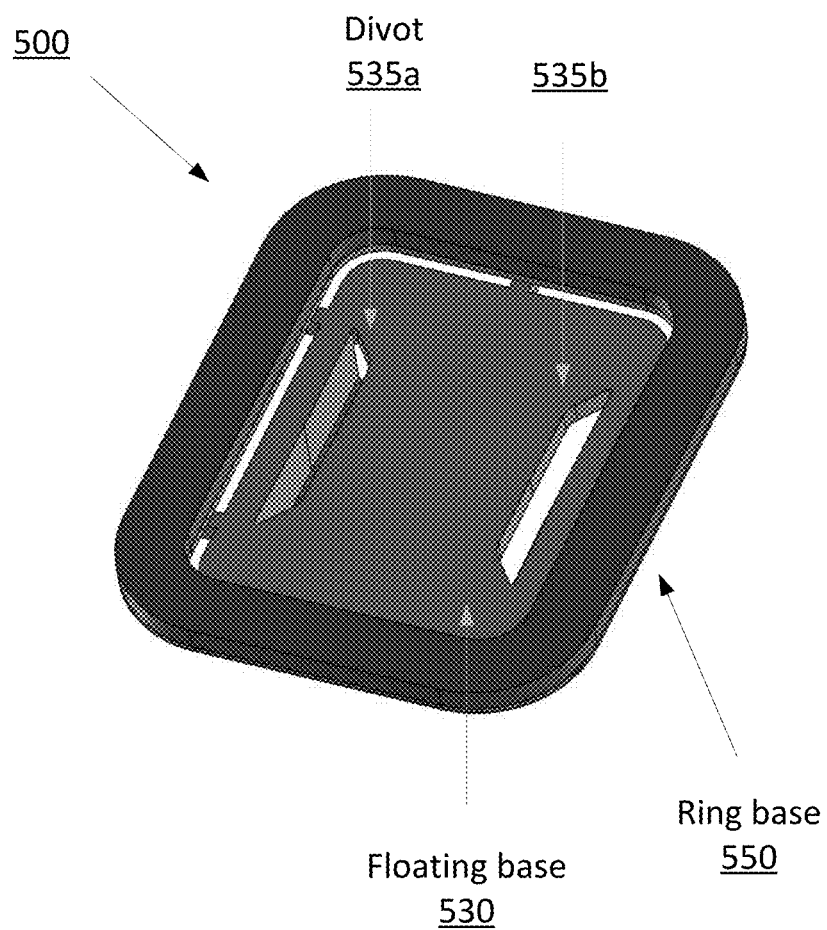
FIG. 5b illustrates a bottom view of a non-flexible camera mount, according to one embodiment.

FIG. 5b features a bottom view of the camera mount 500 depicted in FIG. 5a. The underside of the mount 500 includes two trapezoidal divots 535a and 535b, one underneath each of the retaining walls 510a and 510b. It should be noted that in some embodiments, one or more of the ring base 550 and the floating base 530 can be shapes other than a rectangle, for instance a circle, and in some embodiments, the divots can be any shape, such as rectangular. In addition, alternative embodiments can include different numbers, arrangements, and locations of detachable tabs.

In some embodiments, a camera assembly (such as the camera housing 100 of FIG. 1a) is coupled to a lower mount component 160, which is then coupled to the floating base 530 via the contact base 520 and retaining walls 510a and 510b, as described above. The mount 500 can in turn be coupled to an object or surface, such as the outer surface of a helmet. When a force is exerted on the camera assembly, a reciprocal force is exerted on one or more of the detachable tabs 540a, 540b, 540c, 540d, 540e, and 540f by the floating base 530, cause one or more of the detachable tabs to detach, fracture, or shear, decoupling the floating base (and thereby the coupled camera assembly) from the ring base 550.

Figure 6:
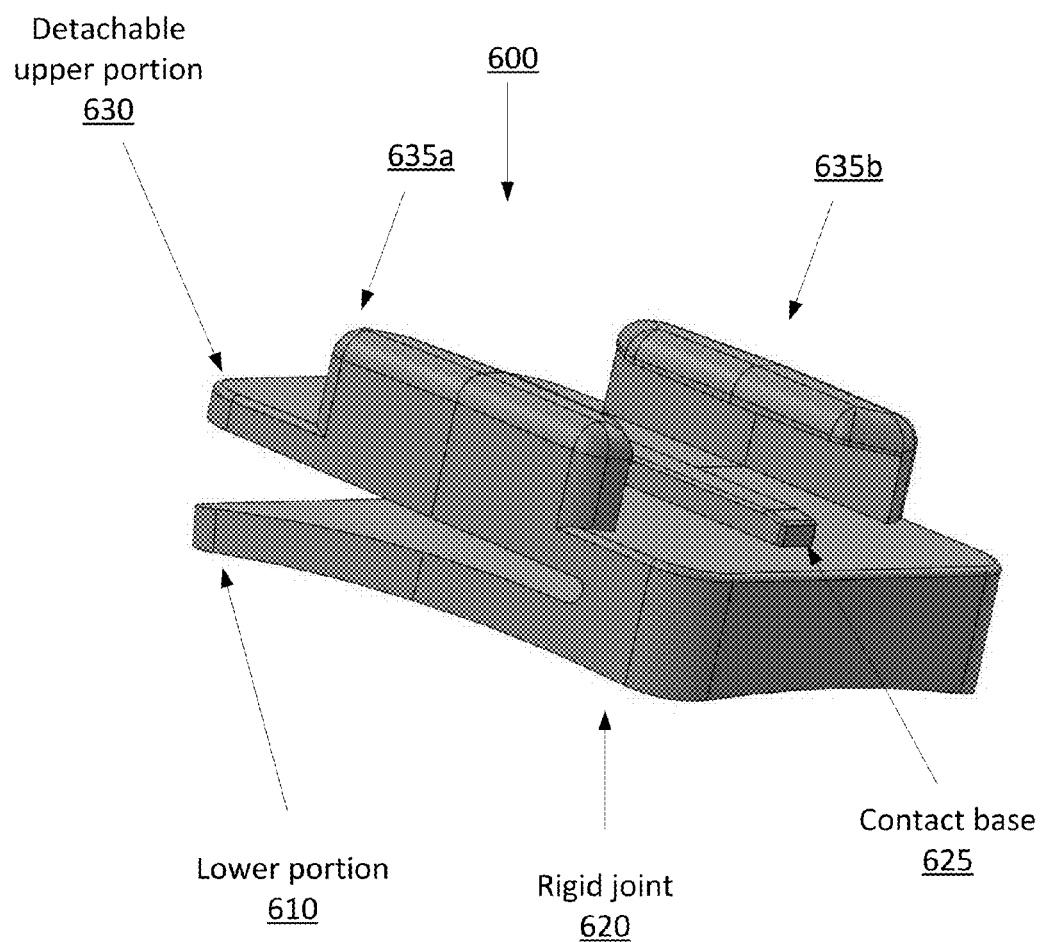
FIG. 6 illustrates a non-flexible camera mount, according to one embodiment.

FIG. 6 illustrates an additional embodiment of a non-flexible mount, according to one embodiment. The mount 600 includes a lower portion 610, which may be coupled to a surface or object, for instance with an adhesive. The lower portion 610 is adjoined to a detachable upper portion 630 via a rigid joint 620. The upper portion includes a contact base 625 and retaining walls 635a and 635b, designed to couple with the base mount component 160 as described above.

As described above, a camera assembly is coupled to a lower mount component 160, which is coupled to the detachable upper portion 630 of the mount 600. In response to a force exerted on the camera assembly, a reciprocal force is exerted on detachable upper portion 630, causing the upper portion 630 to bend towards the lower portion 610 and in turn on the rigid joint 620. Due to the decrease in lateral separation between the detachable upper portion 630 and the lower portion 610, a torque is exerted on the rigid joint 620. If the torque is of sufficient magnitude, the rigid joint 620 will detach, fracture, or separate, causing the detachable upper portion 630 to become decoupled from the lower portion 610. Accordingly, the detachable upper portion 630, lower mount component 160, and camera assembly will separate from the lower portion 610.

Figure 7A:
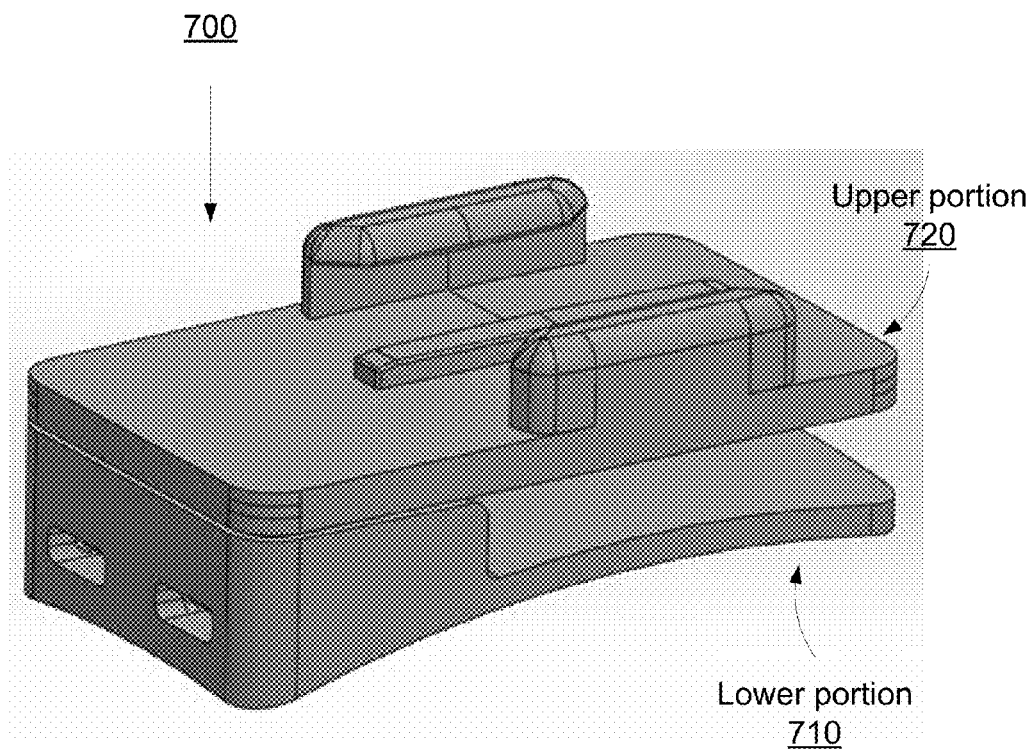
FIG. 7a illustrates a flexible camera mount, according to one embodiment.

FIG. 7a illustrates an alternative embodiment of the camera mount 600 of FIG. 6a, according to one embodiment. The re-usable mount 700 includes a lower portion 710 and an upper portion 720, designed to detach without breaking in response to a force exerted on a camera assembly coupled to the upper portion 720. The lower portion 710 may be attached to an object or surface as described in previous embodiments.

Figure 7B:
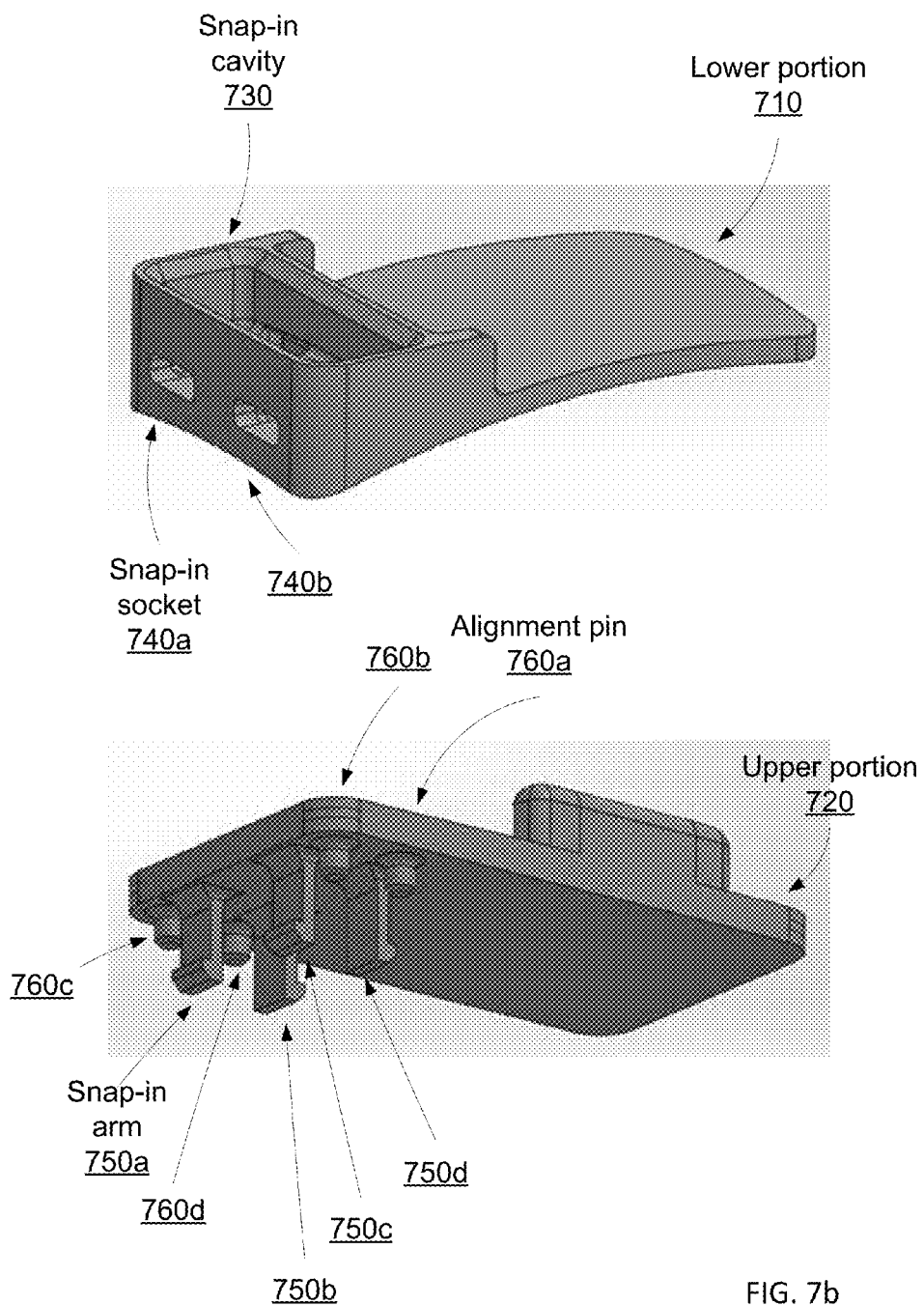
FIG. 7b illustrates separately each piece of a flexible camera mount, according to one embodiment.

FIG. 7b illustrates the lower portion 710 and upper portion 720 separately. The lower portion 710 includes a rectangular snap-in cavity 730 designed to accommodate the upper portion 720. Four snap-in arms 750a, 750b, 750c, and 750d protrude from the underside of the upper portion 720 and are configured for insertion into the snap-in cavity 730. Two of the snap-in arms 750a and 750c are configured to fit into the snap-in sockets 740a and 740b on the outer side of the snap-in cavity 730 when the snap-in arms 750a, 750b, 750c, and 750d are inserted into the snap-in cavity 730. Likewise, the snap-in arms 750b and 750d are configured to fit into snap-in sockets (not illustrated) opposite the snap-in sockets 740a and 740b. The upper portion 720 also includes four alignment pins 760a, 760b, 760c, and 760d protruding from the underside of the upper portion 720, which facilitates alignment between the upper portion 720 and lower portion 710 by fitting into the corners of the snap-in cavity 730.

The upper portion 720 also includes a contact base and retaining walls designed to couple to the lower mount component 160 of FIG. 1c, similar to previous embodiments. In a typical embodiment, the camera housing 100 of FIG. 1a is coupled to the lower mount component 160, which is then coupled to the detachable upper portion 720 of the mount 700. In response to a force exerted on the camera assembly, a reciprocal force is exerted on detachable upper portion 720. Due to the decrease in lateral separation between the detachable upper portion 720 and the lower portion 710, a torque is exerted on the snap-in cavity 730. If the torque is of sufficient magnitude, the upper portion 720 and the lower portion 710 will separate, causing the upper portion 720, and with it the camera housing 100 and base mount component 160, to become decoupled from the lower portion 710. The lower portion 710 will remain attached to the mounting surface. The camera housing 100, base mount component 160, and upper portion 720 may be retrieved and re-attached to the lower portion 710.

The non-flexible components described herein—including rigid joints, breakable tabs, retaining walls, and contact bases—can be made out of a variety of materials. Examples include acrylic, brittle plastics, certain types of epoxies, and so on. The flexible components described herein can also be made out of a variety of materials. Examples include certain classes of polycarbonate, flexible types of polyurethane, and other plastics.

Figure 8A:
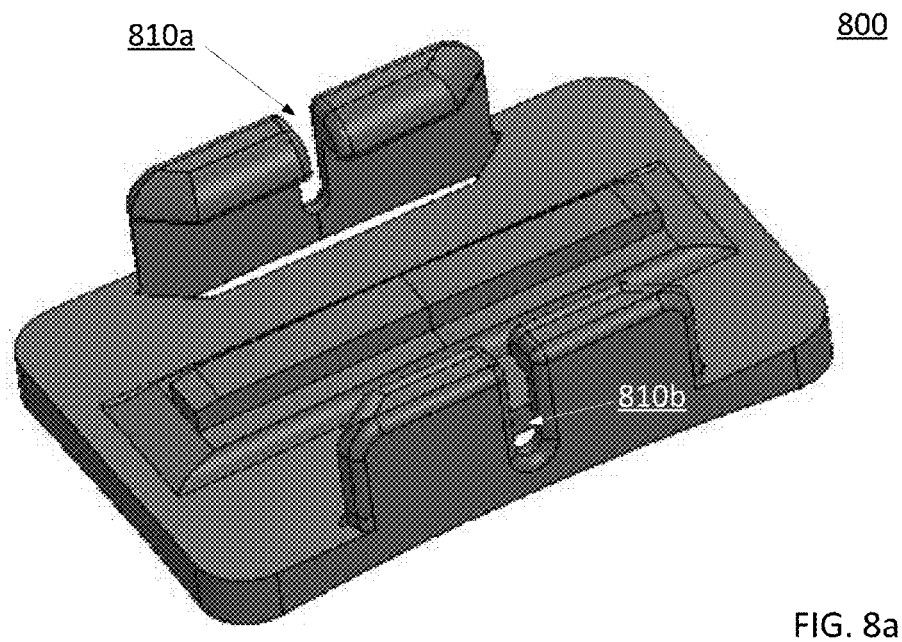
FIGS. 8a and 8b illustrate an additional detachable camera mount, according to one embodiment.
Figure 8B:
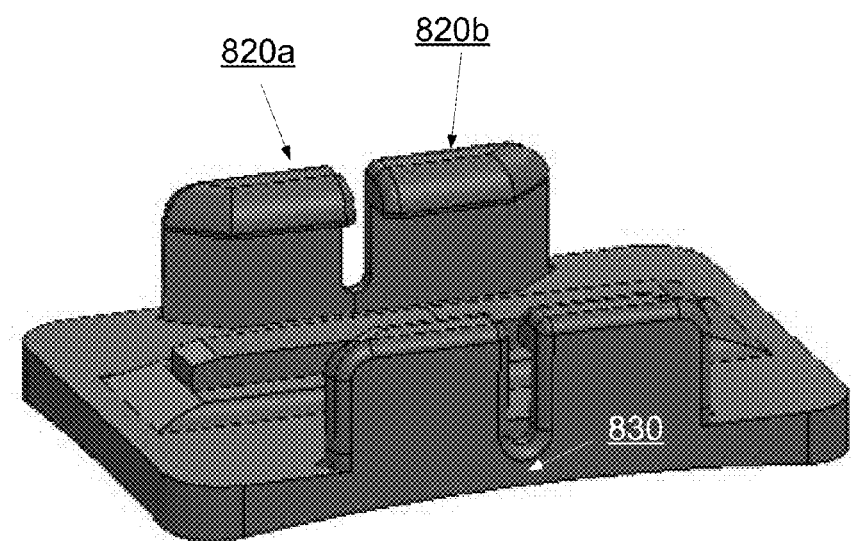

FIGS. 8a and 8b illustrate an additional detachable camera mount, according to one embodiment. The detachable camera mount 800 illustrated in FIG. 8a can be either flexible or non-flexible. In some embodiments, the detachable camera mount 800 is similar in shape, structure, and function to the mount 300 of FIG. 3 or the mount 400 of FIG. 4 as described above. However, in contrast to the embodiments described above, the mount 800 includes a slot 810a and 810b in each flexible retaining wall of the mount 800.

Each of the slots 810a and 810b run from a top of a flexible retaining wall (the portion of the flexible retaining wall including a retaining lip) towards a top surface of the mount 800, parallel to each retaining side edge of the retaining wall. The height of each slot 810a, 810b can be, for instance, greater than 50%, 75%, or 90% of the height of a corresponding retaining wall.

A reduced-height portion 830 of the retaining wall is located immediately below each slot 810a, 810b. In some embodiments, a height of the reduced-height portion 830 is between 50% and 5% of the height of a corresponding slot or retaining wall. In some embodiments, the height of the reduced-height portion is substantially equal to the distance between a top surface and a bottom surface of the mount 800.

Each slot 810a, 810b divides each retaining wall into two portions. As illustrated in the embodiment of FIG. 8b, a retaining wall is divided into portions 820a and 820b by a corresponding retaining wall slot. Each retaining wall portion 820a, 820b includes a retaining lip, an outer retaining edge, and an inner retaining edge (the edge formed by the corresponding retaining wall slot). It should be noted that although the retaining wall portions corresponding to the slot 810b are not labeled within the embodiments of FIGS. 8a and 8b, references made to the retaining wall portions 820a or 820b herein apply equally to the retaining wall portions corresponding to the slot 810b.

In embodiments where the mount 800 is flexible, each of the retaining wall portions 820a, 820b can flex outward and away from the mount 800. In some embodiments, the amount each portion 820a, 820b flexes outward and away from the mount 800 is proportional to the mount of force applied to the portion 820a, 820b by (for instance) a reciprocal camera mount component. In some embodiments, each portion 820a, 820b flexes outward by a different amount when a force is applied to the mount 800 by a reciprocal mount component.

When a reciprocal camera mount component is coupled to the mount 800, a force applied to mount 800 by the reciprocal camera mount component that causes at least one retaining wall portion to flex outward by a threshold amount can cause the reciprocal camera mount component to decouple from the mount 800. The inclusion of slots 810a, 810b within each retaining wall can beneficially reduce the amount of force required to cause each retaining wall portion 820a, 820b to flex outward by a threshold amount (thereby causing the reciprocal camera mount component to decouple from the mount 800) relative to retaining wall embodiments without slots. Thus, the mount 800 can beneficially aid a camera in decoupling from the mount 800 in response to a force applied to the camera. In some embodiments, a camera (or reciprocal camera mount) can decouple from a mount with slots within the mount's retaining walls in response to a smaller force applied to the camera than a camera can decouple from a mount without slots within the mount's retaining walls.

In some embodiments, the mount 800 is composed of the same non-flexible materials as the mount 400 of FIG. 4. In such embodiments, when an above threshold force is applied to one of retaining wall portion 820a or 820b (by, for example, a reciprocal camera mount component or a camera), either retaining wall portion can detach from the mount 800. Accordingly, if a camera or reciprocal camera mount component is coupled to the mount 800, and if the camera or reciprocal camera mount component applies an above-threshold force to a retaining wall portion 820a or 820b, the retaining wall portion can detach, causing the camera or reciprocal camera mount component to decouple from the mount 800.

In such embodiments, the inclusion of a slot 810a, 810b within a retaining wall beneficially introduces an additional portion of the retaining wall that can sever (namely, the reduced-height portion 830), thereby increasing the likelihood that a camera or reciprocal mount component can detach from the mount 800 in response to an above-threshold force applied to the mount 800. In some embodiments, a camera (or reciprocal camera mount) can cause one or more retaining wall portions to detach from the mount 800 in response to a smaller force applied to the camera than a camera can cause a retaining wall without a slot to detach.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for detachable camera mounts as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera mount comprising:
   a mount base with a bottom surface comprising coupling means for coupling the mount base to an object;
   a spine protruding from a top surface of the mount base;
   an elevated surface protruding from the top surface of the mount base on either side of the spine such that a camera, when coupled to the camera mount, abuts the elevated surface and not the top surface of the mount base;
   a first flexible arm protruding from a first side of the top surface of the mount base, the first flexible arm comprising a first slot separating the first flexible arm into a first portion and a second portion, each of the first portion and the second portion configured to elastically flex outward and away from the spine in response to an impact force on a camera coupled to the mount at least partially in a direction of the first portion or the second portion, respectively;
   a second flexible arm protruding from a second side of the top surface of the mount base opposite the first side, the second flexible arm separating the second flexible arm into a third portion and a fourth portion, each of the third portion and the fourth portion configured to elastically flex outward and away from the spine in response to an impact force on the camera at least partially in a direction of the third portion or the fourth portion, respectively;
   wherein the first flexible arm and the second flexible arm are configured to secure the camera to the camera mount.

2. The camera mount of claim 1, wherein the flexible arms comprise a flexible polycarbonate material.

3. The camera mount of claim 1, further comprising:
   a first divot in the mount base adjacent to the first flexible arm and between the first flexible arm and the spine; and
   a second divot in the mount base adjacent to the second flexible arm and between the second flexible arm and the spine.

4. The camera mount of claim 1, wherein the bottom surface of the mount base is either concave or flat.

5. The camera mount of claim 1, wherein the coupling means comprises one or more of: an adhesive, a buckle, a latch, a button, a rail, and a lock.

6. The camera mount of claim 1, wherein each of the first portion, the second portion, the third portion, and the fourth portion comprise a lip configured to abut a top surface of a reciprocal camera mounting component configured to couple to the camera, securing the reciprocal camera mounting component to the camera mount.

7. A camera mount comprising:
   a mount base with a bottom surface comprising coupling means for coupling the mount base to an object;
   a spine protruding from a top surface of the mount base;
   a first inflexible arm protruding from a first side of the top surface of the mount base, the first inflexible arm comprising a first slot separating the first inflexible arm into a first portion and a second portion, each of the first portion and the second portion configured to fracture in response to an above-threshold impact force on a camera coupled to the mount at least partially in a direction of the first portion or the second portion, respectively;
   a second inflexible arm protruding from a second side of the top surface of the mount base opposite the first side, the second inflexible arm comprising a second slot separating the second inflexible arm into a third portion and a fourth portion, each of the third portion and the fourth portion configured to fracture in response to an above-threshold impact force on the camera at least partially in a direction of the third portion or the fourth portion, respectively;
   a first elevated surface protruding from the top surface of the mount base adjacent to the first inflexible arm and between the first inflexible arm and the spine;
   a second elevated surface protruding from the top surface of the mount base adjacent to the second inflexible arm and between the second inflexible arm and the spine;

wherein the camera, when the camera is coupled to the camera mount, abuts the first elevated surface and the second elevated surface and not the top surface of the mount base; and wherein the first inflexible arm and the second inflexible arm are configured to secure the camera to the camera mount.

8. The camera mount of claim 7, wherein the inflexible arms comprise a brittle plastic material.

9. The camera mount of claim 7, further comprising:
a first divot in the mount base adjacent to the first elevated surface and between the first inflexible arm and the spine; and
a second divot in the mount base adjacent to the second elevated surface and between the second inflexible arm and the spine.

10. The camera mount of claim 9, further comprising:
a third divot in the mount base adjacent to the spine and between the first inflexible arm and the spine; and
a fourth divot in the mount base adjacent to the spine and between the second inflexible arm and the spine.

11. The camera mount of claim 10, wherein the spine couples to the mount base at two points of contact, one on either end of the spine, and wherein the spine is configured to fracture at one or both points of contact in response to an above-threshold impact force on a camera coupled to the mount.

12. The camera mount of claim 7, wherein the bottom surface of the mount base is either concave or flat.

13. The camera mount of claim 7, wherein the coupling means comprises one or more of: an adhesive, a buckle, a latch, a button, a rail, and a lock.

14. The camera mount of claim 7, wherein each of the first portion, the second portion, the third portion, and the fourth portion comprise a lip configured to abut a top surface of a reciprocal camera mounting component configured to couple to the camera, securing the reciprocal camera mounting component to the camera mount.

15. A camera mount comprising:
a mount base with a bottom surface comprising coupling means for coupling the mount base to an object;
a spine protruding from a top surface of the mount base;
a first flexible arm protruding from a first side of the top surface of the mount base, the first flexible arm comprising a first slot separating the first flexible arm into a first portion and a second portion, each of the first portion and the second portion configured to elastically flex outward and away from the spine in response to an impact force on a camera coupled to the mount at least partially in a direction of the first portion or the second portion, respectively;
a second flexible arm protruding from a second side of the top surface of the mount base opposite the first side, the second flexible arm comprising a second slot separating the second flexible arm into a third portion and a fourth portion, each of the third portion and the fourth portion configured to elastically flex outward and away from the spine in response to an impact force on the camera at least partially in a direction of the third portion or the fourth portion, respectively;
a first divot in the mount base adjacent to the first flexible arm and between the first flexible arm and the spine; and
a second divot in the mount base adjacent to the second flexible arm and between the second flexible arm and the spine;

wherein the first flexible arm and the second flexible arm are configured to secure the camera to the camera mount.

16. The camera mount of claim 15, wherein the flexible arms comprise a flexible polycarbonate material.

17. The camera mount of claim 15, further comprising an elevated surface protruding from the top surface of the mount base on either side of the spine such that a camera, when coupled to the camera mount, abuts the elevated surface and not the top surface of the mount base.

18. The camera mount of claim 15, wherein the bottom surface of the mount base is either concave or flat.

19. The camera mount of claim 15, wherein the coupling means comprises one or more of: an adhesive, a buckle, a latch, a button, a rail, and a lock.

20. The camera mount of claim 15, wherein each of the first portion, the second portion, the third portion, and the fourth portion comprise a lip configured to abut a top surface of a reciprocal camera mounting component configured to couple to the camera, securing the reciprocal camera mounting component to the camera mount.

21. A camera mount comprising:
a mount base with a bottom surface comprising coupling means for coupling the mount base to an object;
a spine protruding from a top surface of the mount base;
a first flexible arm protruding from a first side of the top surface of the mount base, the first flexible arm comprising a first slot separating the first flexible arm into a first portion and a second portion, each of the first portion and the second portion configured to elastically flex outward and away from the spine in response to an impact force on a camera coupled to the mount at least partially in a direction of the first portion or the second portion, respectively;
a second flexible arm protruding from a second side of the top surface of the mount base opposite the first side, the second flexible arm separating the second flexible arm into a third portion and a fourth portion, each of the third portion and the fourth portion configured to elastically flex outward and away from the spine in response to an impact force on the camera at least partially in a direction of the third portion or the fourth portion, respectively;
wherein the first flexible arm and the second flexible arm are configured to secure the camera to the camera mount.

22. The camera mount of claim 21, wherein the flexible arms comprise a flexible polycarbonate material.

23. The camera mount of claim 21, further comprising:
a first divot in the mount base adjacent to the first flexible arm and between the first flexible arm and the spine; and
a second divot in the mount base adjacent to the second flexible arm and between the second flexible arm and the spine.

24. The camera mount of claim 21, wherein the bottom surface of the mount base is either concave or flat.

25. The camera mount of claim 21, wherein the coupling means comprises one or more of: an adhesive, a buckle, a latch, a button, a rail, and a lock.

26. The camera mount of claim 21, wherein each of the first portion, the second portion, the third portion, and the fourth portion comprise a lip configured to abut a top surface of a reciprocal camera mounting component configured to couple to the camera, securing the reciprocal camera mounting component to the camera mount.

* * * * *